United States Patent [19]

Teichmann

[11] Patent Number: 4,711,814

[45] Date of Patent: Dec. 8, 1987

[54] NICKEL PARTICLE PLATING SYSTEM

[76] Inventor: Robert J. Teichmann, 152 Bell St., Belleville, N.J. 07109

[21] Appl. No.: 875,964

[22] Filed: Jun. 19, 1986

[51] Int. Cl.$^4$ .......................... B05D 5/12; B05D 7/00; B32B 5/16; H01B 1/02

[52] U.S. Cl. .................................... 428/403; 252/513; 252/514; 427/125; 427/129; 427/132; 427/214; 427/216; 427/217; 427/328

[58] Field of Search ............... 252/513, 514; 427/125, 427/127, 216, 217, 129, 132, 214, 328; 428/403

[56] References Cited

U.S. PATENT DOCUMENTS 3,725,308 4/1973 Ostolski .............................. 252/513
4,450,188 5/1984 Kawasumi ...................... 427/125 X Primary Examiner—Michael R. Lusignan
Attorney, Agent, or Firm—Lee C. Robinson, Jr.

[57] ABSTRACT

A nickel particle plating system in which a multiplicity of minute nickel particles are provided with gold and silver coatings and are deposited in a nonconductive matrix to form an electro-conductive body in which the particles may be placed along conductive paths. The coatings are applied to the particles in a unique manner which enables the realization of a gold coating having a maximum thickness of about 5 percent of the maximum particle dimension and a silver coating having a maximum thickness of about 10 percent of the maximum particle dimension.

9 Claims, 3 Drawing Figures

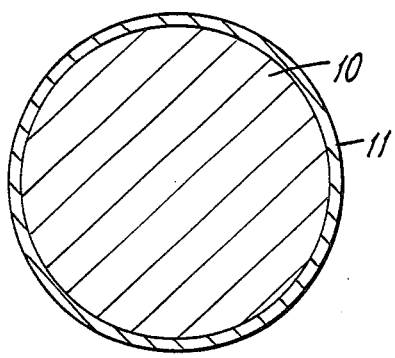
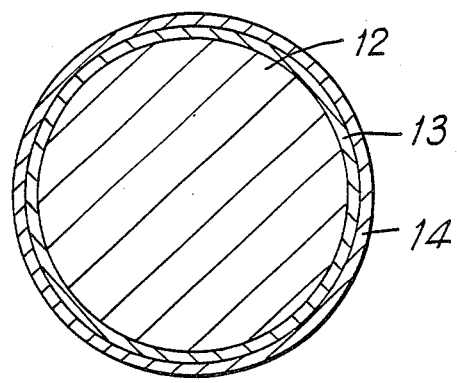
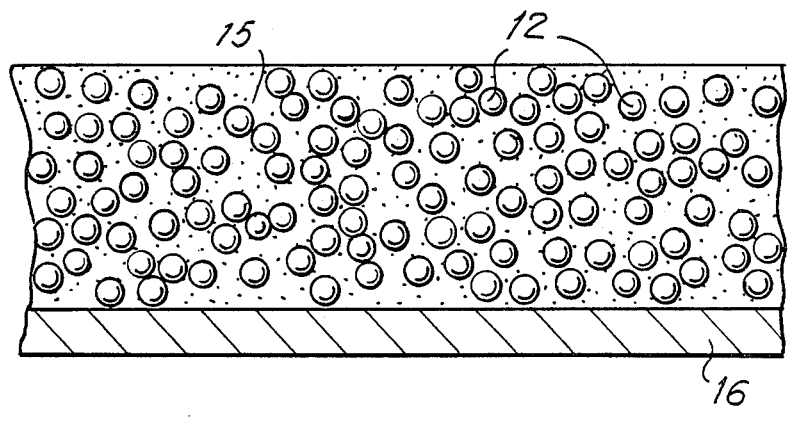

NICKEL PARTICLE PLATING SYSTEM

BACKGROUND OF THE INVENTION

This invention relates to electroconductive particles and more particularly to such particles for use in a matrix or substrate, and to a method for making the particles.

There has been developed a conductive particle which exhibits good electrical properties particularly when incorporated in a paste material or other substrate. Representative particles of this type are disclosed, for example, in John C. Abrams U.S. Pat. Nos. 4,419,279 and 4,496,475. The particles are in the form of glass beads, flakes or other inorganic particulate material and are provided with a coating of silver having a carefully controlled thickness.

Heretofore, electrically conductive particles have exhibited certain disadvantages. As an illustration, difficulties were encountered in orienting the particles within a matrix or substrate. In addition, in some cases the particles exhibited poor sulfide and other corrosion resistance, and difficulties also were encountered under certain electric fields or humidity conditions because of the migration of the silver.

SUMMARY

One general object of the invention, therefore, is to provide new and improved electroconductive particles for use in a matrix or substrate.

Another object of the invention is to provide a novel method for making electroconductive particles.

More specifically, it is an object of this invention to provide electroconductive particles of the character indicated which exhibit improved resistance to migration and corrosion.

Still another object of the invention is to provide such electroconductive particles which enable the realization of substantially reduced contact resistance.

A still further object of the invention is to provide a new and improved method for making electroconductive particles which is economical and thoroughly reliable in operation.

In an illustrative embodiment of the present invention, a multiplicity of spherical particles of magnetic material are thoroughly cleaned and are then coated with one or more noble metal layers in accordance with a carefully controlled coating procedure. The particles may be embedded in an organic matrix or substrate to form a conductive paste, matrix, coating or adhesive, for example, to provide an electroconductive body.

In accordance with one feature of the invention, the spherical or other particles are of commercially pure nickel and are of a size, on average, of from 1 to 300 microns in maximum dimension.

In accordance with another feature of the invention, in certain particularly advantageous embodiments, a gold coating is applied to the exterior of the particles. The gold coating preferably has a maximum thickness of about 5 percent of the maximum particle dimension and is about 1 percent to about 15 percent by weight of the particle. With this arrangement, the resistance to corrosion is maintained at a minimum, and there is extremely low contact resistance.

In accordance with a further feature of several good arrangements in accordance with the invention, the particles are provided with a coating of commercially pure silver. In some embodiments the silver coating is interposed between the particle surface and the gold coating with the result that the incidence of silver migration when exposed to electrical fields or certain humidity conditions is substantially reduced.

The present invention, as well as further objects and features thereof, will be more fully understood from the following description of certain preferred embodiments, when read with reference to the accompanying drawing.

BRIEF DESCRIPTION OF THE DRAWING

FIG. 1 is a substantially enlarged vertical sectional view of a magnetic electrically conductive particle in accordance with one illustrative embodiment of the invention.

FIG. 2 is a substantially enlarged vertical sectional view of a magnetic electrically conductive particle in accordance with another illustrative embodiment of the invention.

FIG. 3 is an enlarged fragmentary vertical sectional view of a conductive paste incorporating the particles of FIG. 2.

DESCRIPTION OF CERTAIN PREFERRED EMBODIMENTS

Referring to FIG. 1 of the drawing, there is shown a magnetic electrically conductive solid particle 10 of commercially pure nickel which is provided with a gold coating 11. In the illustrated embodiment the particle 10 advantageously is of bead-like spherical configuration, although in other embodiments the particles may be of irregular or other geometric shapes with good results. The particles 10 are extremely minute and are of a size, on average, of from 1 to 300 microns in maximum dimension.

The gold coating 11 on the nickel particles 10 advantageously has a thickness of at least about 200 angstroms and preferably about 750 angstroms. The thickness of the coating should be sufficient to completely and uniformly cover the surface of the particles and will depend in part on the size of the particular particle being coated. For best results the thickness of the coating should be of the order of 0.1 percent to 5 percent of the diameter or other maximum dimension of the particle being coated. The gold coating substantially reduces oxidization and hence enhances the corrosion resistance of the particles.

In several advantageous embodiments of the invention a silver coating is substituted for the gold coating 11 on the particles 10. In other good embodiments the particles are provided with both a silver coating and a gold coating. Referring to FIG. 2, for example, there is shown a nickel particle 12 having an inner coating 13 of silver and an outer gold coating 14. The silver coating 13 preferably ranges from about 4 percent to about 60 percent by weight of the coated particle 12, and the gold coating 14 ranges from about 1 percent to about 15 percent by weight of the coated particle. Among its other advantages, the gold coating 14 has the effect of reducing silver migration under adverse humidity or electric field conditions.

In FIG. 3 there is shown a conductive paste which comprises an organic vehicle 15, illustratively containing polyvinyl alcohol, in which are suspended a multiplicity of the coated particles 12. As is typical, the electroconductive body is deposited on and adheres to a substrate 16 of copper, mica, glass or other suitable material. The particles 12 are randomly oriented within the conductive paste but are in sufficient proximity with one another to allow the free passage of electrons. Some of the coated particles similarly are sufficiently close to the upper surface of the electroconductive body to allow free electron passage between the surface and the coatings on the particles, and other particles are sufficiently close to the substrate 16 to likewise allow free passage of electrons therebetween. Thus, a large number of conductive paths are established through the electroconductive body.

The noble metal coatings may be applied to the magnetic electrically conductive particles by numerous techniques known in the art. As an illustration, the coatings may be applied by fluidization using dry or wet methods, by electroless plating, and the like. Suitable examples of such electroless plating are disclosed in U.S. Pat. No. 3,635,824 issued Jan. 18, 1972 to Raymond G. Brandes et al.

In addition, the coatings may be applied by a particularly advantageous immersion plating technique. To produce the gold coated nickel particles 11 of FIG. 1, for example, a measured quantity of the nickel particles having an average particle size of, say, 75 microns, is placed in a glass round bottom flask. The particles are thoroughly cleaned through the use of a suitable detergent solution, are rinsed with deionized water, and are then immersed in a hydrochloric acid solution while undergoing agitation. The particles are again rinsed with deionized water which has been purged with nitrogen, and this latter rinsing procedure is repeated two or three times to insure that any oxidation of the nickel is maintained at a minimum.

After the excess water is decanted from the thus cleaned nickel particles, a heated gold solution is introduced into the flask during vigorous agitation. The solution preferably comprises potassium gold cyanide containing in the neighborhood of 4 grams of gold per liter. The solution is maintained at an elevated temperature within the range of from about 65° C. to about 95° C.

The nickel particles are agitated in the flask for a period of time sufficient to apply a gold coating to each of the particles. The agitation is continued for, say, ten to fifteen minutes, and the excess gold solution is then decanted. The particles are then rinsed and thoroughly dried.

The silver coating 14 is deposited on the nickel particles 12 by numerous procedures known in the art. For example, the silver coating may be applied by fluidization by dry or wet procedures, by immersion or by electroless deposition or plating, and the like. See, for example, U.S. Pat. No. 3,235,392 granted Feb. 15, 1966 to John Joseph Miles. The gold coating 14 is then applied over the silver coating 13 in the manner described above.

The thickness of the coatings on the nickel particles should be sufficient to provide a continuous electrically conductive coating on each particle. Although the coating thickness depends in part upon the size of the particles, for best results the combined thickness of the silver and gold coatings on each particle should be at least about 300 angstroms with the thickness of the silver coating being about twice the thickness of the gold coating. The maximum thickness of the coatings is determined by cost constraints and also because there is a critical limit to the amount of silver in particular that can be deposited on very small particles.

Taking these various factors into consideration, the silver coating 13 advantageously has a maximum thickness of about 10 percent of the maximum particle dimension, and the coating is about 4 percent to about 60 percent by weight of the particle. The gold coatings 11 and 14, on the other hand, each has a maximum thickness of about 5 percent of the maximum particle dimension, and each gold coating is about 1 percent to about 15 percent by weight of the particle.

The nickel particles coated in accordance with this invention provide a conductive or semi-conductive component for a wide variety of electrical devices. Such devices include, inter alia, conductive paste and coatings, conductive adhesives, and devices used for electromagnetic interference shielding, for example.

As an illustration, the silver and gold coated particles may be incorporated in a methacrylate polymer to form a conductive paste. The particles are suspended in the paste in sufficient quantity so that electrons can pass freely between adjacent particles. The paste is applied to a metallic substrate such that the substrate may serve as a terminal or contact point for an electrical circuit.

The quantity of the particles suspended in the paste depends in part on the type and thickness of the noble metal coating or coatings on the particles. Particularly in cases where the particles have a relatively low noble metal content, however, the coated particles should constitute at least about 15 percent, and preferably about 20 percent, by weight of the paste.

The quantity of noble metal incorporated in the paste in the form of particle coatings is at least 2.0 percent and not more than 60.0 percent by weight of the paste. Particularly good results are achieved in which the noble metal constitutes at least about 15 percent by weight of the paste. The total noble metal content should be sufficient to prevent appreciable impairment of properties, such as loss of conductivity and of adhesion to a substrate, in an electroconductive body made from the paste.

The organic binder from which the conductive paste is formed serves as a matrix and imparts to the paste the proper rheology, including an appropriate consistency for application on a substrate by screening, painting, dipping, etc. Typically, the organic binder contains one or more resins and one or more solvents to give the paste the desired consistency, but in some embodiments the binder is solventless. Illustrations of suitable substances include the low molecular weight aliphatically unsaturated organic polymers, or a mixture of an aliphatically unsaturated organic polymer and a copolymerizable aliphatically unsaturated organic monomer, such as styrene. Further examples encompass the low molecular weight polyamides such as those described in U.S. Pat. No. 3,535,148 granted Oct. 20, 1970 to Abraham Ravve, low molecular weight polyesters such as described in U.S. Pat. No. 3,567,494 granted Mar. 2, 1971 to Chester W. Fitko, acrylate esters and methacrylic esters of polyhydric alcohols, and the various additional binder materials described in U.S. Pat. No. 4,496,475 referred to above.

The following examples are set forth in illustration of the invention and should not be construed as a limitation thereof. Unless otherwise indicated, all parts and percentages given are by weight.

EXAMPLE I

Fifty grams of spherical nickel particles having an average particle size of 75 microns were placed in a glass round bottom flask. A 5 percent solution of Liquinox detergent was added to the particles at a temperature of 60° C, and the particles were agitated within the flask for 10 minutes. Following the agitation, the particles were rinsed with deionized water, a 50 percent by volume hydrochloric acid solution was added at the 60° C. temperature and the particles were again agitated for about 10 minutes. Following three successive rinsing steps with deionized water, the particles were observed to be clean with little or no surface oxidation and with a pH of 4.

An Atomex potassium gold cyanide solution obtained from the Engelhard Corp. was then poured into the flask with the cleaned and dried nickel particles preheated to a temperature of 90° C. The solution contained 4.1 grams of gold per liter. The flask was vigorously agitated for approximately 10 to 15 minutes, and the excess solution was decanted from the flask. The particles were then rinsed and dried.

Upon removal from the flask, the spherical nickel particles were observed to have a uniform gold coating on their entire surface area. The thickness of the coating was 750 angstroms.

EXAMPLE II

Spherical nickel particles having an average diameter of 60 microns were placed in a round bottom flask and cleaned in the manner described in Example I. A 45 percent by weight silver coating was applied to the nickel particles by means of conventional immersion plating, and after rinsing and drying the particles were observed to have a uniform and continuous silver coating with a thickness of 2.4 microns. The coating thickness was 4 percent of the maximum dimension of the particles.

EXAMPLE III

Nickel particles having a maximum dimension of 20 microns were coated with silver through the use of the immersion plating technique to provide a uniform and continuous silver coating on each particle. The amount by weight of silver was 15 percent of the weight of the particles, and the thickness of the coating was 0.23 microns or 1.15 percent of the maximum particle dimension. A gold coating was then applied over the silver coating on each particle in the manner described in Example I. The gold coating was 8 percent by weight of the particles, and its thickness was 0.07 microns of 0.35 percent of the maximum particle dimension.

EXAMPLE IV

The procedure of Example III was repeated to provide silver and gold coatings on nickel particles having an average diameter of 10 microns. The silver coating represented 45 percent by weight of the particles and had a thickness of 0.69 microns or 6.9 percent of the maximum particle dimension. The gold coating was 12 percent by weight of the particles and had a thickness of 0.08 microns or 0.8 percent of the maximum particle dimension.

EXAMPLE V

In each of the foregoing examples, the coated nickel particles may be combined with an organic binder formable into a matrix. For example, the coated nickel particles, in admixture with the organic binder, can be wetted in a three-roll mill; then the coated particles can be incorporated and appropriately mixed into a system in a suitable apparatus such as an ordinary paint shaker. The resulting paste is applied to a substrate, for example, a metal conductor or a capacitor, resistor, or other dielectric component, etc., in connection with the fabrication of a further circuit component, or is packaged and stored or shipped for subsequent use.

Although the invention has been described and illustrated as having particular utility in the manufacture of coated nickel spheres, particles of various other shapes may be produced thereby without departing from the spirit or scope of the appended claims. As an illustration, nickel flakes or irregularly shaped particles, for example, may be coated with silver or gold and arrayed in a suitable matrix in the manner disclosed herein. The particles should contain sufficient nickel to provide a core material having an exposed nickel surface of sufficient thickness to enable the realization of optimum magnetic characteristics.

The terms and expressions which have been employed are used as terms of description and not of limitation, and there is no intention in the use of such terms and expressions of excluding any equivalents of the features shown and described, or portions thereof, it being recognized that various modifications are possible within the scope of the invention claimed.

I claim:

1. A particulate material for an electroconductive body, the material comprising, in combination:
   a multiplicity of nickel particles of a size, on average, of from 1 to 300 microns in maximum dimension;
   a silver coating on each of the nickel particles, the silver coating having a maximum thickness of about 10 percent of the maximum particle dimension and being about 4 percent to about 60 percent by weight of the particle; and
   a gold coating surrounding the silver coating on each of said nickel particles, the gold coating on each particle having a maximum thickness of about 5 percent of the maximum particle dimension and being about 1 percent to about 15 percent by weight of the particle.

2. A particulate material as defined in claim 1, in which the combined thickness of the silver and gold coatings on each particle is at least about 200 angstroms.

3. A particulate material as defined in claim 1, in which the thickness of the silver coating is about twice the thickness of the gold coating.

4. An electroconductive body comprising, in combination:
   a nonconductive matrix;
   a multiplicity of nickel particles embedded in the matrix, the nickel particles being of a size, on average, of from 1 to 300 microns in maximum dimension;
   a silver coating on each of the nickel particles, the silver coating having a maximum thickness of about 10 percent of the maximum particle dimension and being about 4 percent to about 60 percent by weight of the particle; and
   an additional coating of noble metal other than silver surrounding the silver coating on each of said nickel particles, the additional coating on each particle having a maximum thickness of about 5 percent of the maximum particle dimension and being about 1 percent to about 15 percent by weight of the particle;
   the combined thickness of the silver and additional coatings on each particle being at least about 200 angstroms and the thickness of the silver coating being about twice the thickness of the additional coating.

5. An electroconductive body as defined in claim 4, in which the silver and additional coatings on said particles comprise at least about 2.0 percent by weight of the matrix.

6. A method of making magnetic electrically conductive particles, the method comprising, in combination:
cleaning a multiplicity of nickel particles of a size, on average, of from 1 to 300 microns in maximum dimension;
applying a deionized aqueous liquid to the nickel particles and then removing the excess liquid therefrom;
coating each of the nickel particles with silver to provide a silver coating on each particle;
immersing the nickel particles in a gold plating immersion bath; and
agitating the nickel particles in the immersion bath for a period of time sufficient to apply a gold coating on each of the particles;
the combined thickness of the silver and gold coatings on each particle being at least about 200 angstroms.

7. A method as defined in claim 6, in which the thickness of the silver coating is about twice the thickness of the gold coating.

8. A method of making magnetic electrically conductive particles, the method comprising, in combination:
cleaning a multiplicity of nickel particles of a size, on average, of from 1 to 300 microns in maximum dimension;
applying a deionized aqueous liquid to the nickel particles and then removing the excess liquid therefrom;
coating each of the nickel particles with silver to provide a silver coating having a maximum thickness of about 10 percent of the maximum particle dimension, the silver coating being about 4 percent to about 60 percent by weight of the particles;
immersing the nickel particles in a gold plating immersion bath; and
agitating the nickel particles in the immersion bath for a period of time sufficient to apply a gold coating on each of the particles, the gold coating on each particle having a maximum thickness of about 5 percent of the maximum particle dimension and being about 1 percent to about 15 percent by weight of the particle;
the combined thickness of the silver and gold coatings on each particle being at least about 200 angstroms.

9. A method of making magnetic electrically conductive particles, the method comprising, in combination:
cleaning a multiplicity of nickel particles of a size, on average, of from 1 to 300 microns in maximum dimension;
applying a deionized aqueous liquid to the nickel particles and then removing the excess liquid therefrom;
coating each of the nickel particles with silver to provide a silver coating having a maximum thickness of about 10 percent of the maximum particle dimension, the silver coating being about 4 percent to about 60 percent by weight of the particles;
immersing the nickel particles in a gold plating immersion bath containing gold cyanide;
heating the immersion bath to a temperature within the range of from about 65° C. to about 95° C. and
agitating the nickel particles in the immersion bath for a period of time sufficient to apply a gold coating on each of the particles, the gold coating on each particle having a maximum thickness of about 5 percent of the maximum particle dimension and being about 1 percent to about 15 percent by weight of the particle;
the combined thickness of the silver and gold coatings on each particle being at least about 200 angstroms and the thickness of the silver coating being about twice the thickness of the gold coating.

* * * * *